(12) United States Patent  (10) Patent No.: US 8,509,941 B2
Regaard et al.  (45) Date of Patent: Aug. 13, 2013

(54) METHOD AND DEVICE FOR FINE POSITIONING OF A TOOL HAVING A HANDLING APPARATUS

(75) Inventors: Boris Regaard, Ypsilanti, MI (US); Stefan Kaierle, Herzogenrath (DE)

(73) Assignees: Fraunhofer-Gesellschaft zur Foerderung der angewandten Forschung e.V., Munich (DE); Rheinisch-Westfaelische Technische Hochschule Aachen, Aachen (DE)

( * ) Notice: Subject to any disclaimer, the term of this patent is extended or adjusted under 35 U.S.C. 154(b) by 768 days.

(21) Appl. No.: 12/446,407

(22) PCT Filed: Oct. 18, 2007

(86) PCT No.: PCT/DE2007/001856
§ 371 (c)(1),
(2), (4) Date: Aug. 4, 2009

(87) PCT Pub. No.: WO2008/046408
PCT Pub. Date: Apr. 24, 2008

(65) Prior Publication Data
US 2010/0324735 A1   Dec. 23, 2010

(30) Foreign Application Priority Data
Oct. 20, 2006  (DE) .......................... 10 2006 049 627

(51) Int. Cl.
*G06F 19/00* (2011.01)
*G05B 11/18* (2006.01)
(52) U.S. Cl.
USPC ........... 700/193; 700/259; 318/595; 318/640; 901/47; 74/490.06
(58) Field of Classification Search
USPC ................. 700/166, 173–175, 186, 187, 192, 700/193, 195, 250, 253, 259; 318/570, 592–595, 640; 74/490.06, 490.07; 901/2, 9–10, 15, 47
See application file for complete search history.

(56) References Cited

U.S. PATENT DOCUMENTS 4,602,540 A * 7/1986 Murofushi et al. ............. 82/118
4,617,504 A * 10/1986 Detriche ....................... 318/576
(Continued)

FOREIGN PATENT DOCUMENTS
DE  36 18 391 A1  12/1987
DE  36 27 560 A1   2/1988
(Continued)

OTHER PUBLICATIONS

International Search Report Form PCT/ISA/210 dated Jul. 22, 2008, issued in corresponding International Patent Publication No. WO 2008/046408 A3.

*Primary Examiner* — Sean Shechtman
(74) *Attorney, Agent, or Firm* — Venable LLP; Robert Kinberg; Tamatane J. Aga (57) ABSTRACT

The present invention relates to a method and a device for the machining of an object using a tool, in which the tool (2) or the object (18) is guided using a handling apparatus, which has multiple movement axes for the coarse positioning of the tool (2) or object (18), which form a kinematic chain. In the method, an additional actuator (3), which has a higher positioning precision in at least one dimension or axis than the other movement axes, is inserted between a terminal link (1) of the kinematic chain and the tool (2) or object (18). A relative movement of the tool (2) or terminal link (1) of the kinematic chain to the object (18) is detected using at least one sensor (5) and a deviation from a target movement path is compensated for using the additional actuator (3). The method and the associated device allow the use of robots or other handling apparatuses having lower path precision for applications which require a high precision during the guiding of the tool.

16 Claims, 7 Drawing Sheets

(56) References Cited

U.S. PATENT DOCUMENTS

| | | | | |
|---|---|---|---|---|
| 4,833,381 A | * | 5/1989 | Taft et al. | 318/577 |
| 5,900,707 A | * | 5/1999 | Wakui | 318/625 |
| 5,943,476 A | * | 8/1999 | Dougherty et al. | 700/259 |
| 2006/0104734 A1 | * | 5/2006 | Mathis et al. | 408/236 |

FOREIGN PATENT DOCUMENTS

| | | |
|---|---|---|
| DE | 198 49 720 A1 | 5/2000 |
| DE | 101 26 725 A1 | 5/2002 |
| EP | 0 141 717 A | 5/1985 |
| JP | 11333771 A | 12/1999 |
| WO | WO-2004/045798 A1 | 6/2004 |

* cited by examiner

METHOD AND DEVICE FOR FINE POSITIONING OF A TOOL HAVING A HANDLING APPARATUS

TECHNICAL AREA

The present invention relates to a method and a device for the fine positioning of a tool during the machining of an object, in which the tool or object is guided by a handling apparatus, which has multiple movement axes for the coarse positioning of the tool or object.

The method and the device are suitable for all machining methods in which a feed movement of the tool or the workpiece and/or object is performed. Exemplary fields of application are robot-controlled milling, robot-controlled electric arc welding, robot-controlled laser beam cutting, or manually-controlled machining.

PRIOR ART

The automation of material machining using handling apparatuses, primarily using buckling arm robots and gantry robots, is highly significant in manufacturing. With advancing quality requirements, the requirements and the precision of the robot systems rise. Currently, significant efforts must be made in this case to improve the path precision of the robots by design measures and new control strategies. The object of the present invention comprises disclosing a method and a device for the fine positioning of a tool having a handling apparatus, using which high path precision and positioning precision of the tool on the object may be achieved. The method is also to allow the use of handling apparatuses, in particular simple robot systems, which have a low path precision.

DESCRIPTION OF THE INVENTION

The object is achieved by the method and the device according to claims 1 and 14. Advantageous designs of the method and the device are the subject matter of the subclaims or may be inferred from the following description and the exemplary embodiments.

In the present method, the tool or the object is guided by a handling apparatus, which has multiple movement axes for the coarse positioning of the tool or object in the form of a kinematic chain. The handling apparatus is preferably a robot, in particular an industrial robot. In addition to an automatic handling apparatus, however, it may also be a non-automatic, i.e., manually-controlled, handling apparatus. To increase the positioning precision during the guiding of the tool or object, an additional actuator, which has at least one dimension or axis of higher positioning precision than the other movement axes, is inserted on the terminal link of the kinematic chain, i.e., between the tool or object and the movement axes. The fine positioning is performed using this additional actuator, in that the relative movement between the object and the tool or the terminal link of the kinematic chain is detected using at least one sensor during the guiding of the tool or object and, in the event of a deviation of an actual movement path, which is calculated therefrom, of this terminal link or the tool or object from a target movement path, the tool or object is automatically tracked (i.e. positioned or moved) using the actuator for the most precise possible compensation of the deviation. The movement paths may be movement paths in relation to a reference fixed in space or in relation to the object for this purpose.

Using the method, a handling apparatus, such as an industrial robot, having low path precision may thus be used to guide the tool or object even in the event of high requirements for the positioning precision, in that the deviations from the target movement path caused by the path imprecision are compensated for by the additional actuator. In this way, precision machining is also possible using simple robot systems or using manual control, in which a positioning precision of 50 to 200 μm, for example, may be achieved. The achievable path precision is independent of the path precision of the handling apparatus employed. The high positioning precision of the additional actuator may be achieved, for example, by using an actuator having linear axes or an x-y scanner—in case of machining using a machining beam. For example, buckling arm robots having low path precision may be used as the robots, which may be provided more cost-effectively than robot systems having higher path precision. The objects may be mechanical workpieces or also patients, for example. The main feed movement in a predetermined direction may, of course, also be performed using an additional feed apparatus for the object or workpiece, the tool then being guided by the handling apparatus to maintain the relative target movement path to the object. In the reverse case, the object may also be guided by the handling apparatus and the tool may be moved in a predefined direction using an additional feed apparatus.

The invention is described hereafter on the basis of an application in which the tool is guided by the handling apparatus. Of course, this description may also be transferred readily to the case in which not the tool, but rather the object, is guided by the handling apparatus.

The sensor for detecting the relative movement, i.e., the relative velocity and relative movement direction, may be both a contactless sensor and also a sensor which operates using contact, for example, in the form of a tactile measurement via a friction wheel or a ball. However, a contactless sensor is preferably used. The sensor is preferably rigidly fastened on the terminal link of the kinematic chain, for example, the robot hand, or on the tool or actuator.

In an especially preferred embodiment, a camera, which is rigidly connected to the actuator, the tool, or the terminal link of the kinematic chain, is used as the sensor, which delivers images reflected from the surface of the object continuously or at sufficiently brief time intervals to obtain overlapping images. The fact is exploited that the workpieces typically have surface roughness during the material machining, which generates an irregular reflection pattern upon illumination, in particular upon illumination which is perpendicular or only slightly inclined to the surface. The workpiece roughness required for this purpose is automatically provided in most applications. Every illuminated surface area of the workpiece generates an irregular reflection pattern, characteristic for this area, which may be detected using the camera, such as a CMOS camera, which is preferably situated perpendicular or slightly inclined. By comparing two sequential recordings or reflection patterns, the relative movement between the sensor and the workpiece may be ascertained, in that image details having the greatest similarity are found in these recordings. The relative movement or relative displacement corresponds to the pixel displacement of these areas while taking the optical imaging for recording the reflection patterns into consideration. The technique of cross-correlation is preferably used for ascertaining the particular most similar partial areas. The incident light required for recording the reflection patterns may originate from the surroundings or may also be generated by a separate light source, for example, using a diode laser.

The present invention is preferably used in the machining of a workpiece using a machining beam which exits from the machining head. For this purpose, the workpiece is preferably illuminated with optical radiation at least approximately coaxially to the machining beam, such as an ion beam, electron beam, or laser beam, in the area of the location of incidence of the machining beam on the workpiece. A compact construction of the overall system is achieved by this coaxial construction of the sensor system for the measurement in the processing point. An especially advantageous application of the method and the associated device is represented by laser material machining, all types of laser beam sources, such as $CO_2$ lasers, Nd:YAG lasers, or diode lasers, being able to be used as beam sources for the machining beam.

The target movement path may be predetermined in an automatic handling apparatus by the controller (control unit) of the handling apparatus, as is typical for many robot-controlled applications. The target movement path must correspondingly be programmed or learned beforehand.

In an advantageous refinement of the present method, this target movement path is not predetermined by the controller of the robot, but rather detected directly on the object during the machining. For this purpose, for example, corresponding artificial markings may be applied to the object beforehand, for example, in the form of colored lines or dots for linear structural changes introduced into the object, for example. Furthermore, the possibility also exists of using naturally predetermined structures on the object for the detection of the target movement path. This is advantageous in particular during the welding of two object parts, in which the gap at the butt joint between the two parts to be welded is acquired in an area lying in front of the current machining location in the feed direction and may be used for ascertaining the target movement path. To detect the corresponding marking(s) on the object, in one embodiment an additional leading sensor is attached to the tool, the actuator, or the terminal link of the kinematic chain, such as the robot hand, for example, a so-called seam tracking sensor for detecting the seam position during the welding procedure. In a preferred design, the sensor provided for detecting the relative movement is also used for detecting the marking(s). The latter is possible in particular if a camera is used as the sensor, which also detects an area in the movement direction in front of the tool in each case, which may be analyzed using a suitable image processing method to detect a marking.

The device implemented to perform the method comprises the handling apparatus having multiple movement axes for the coarse positioning of the tool, the additional actuator, which is situated between the movement axes and the tool, having the correspondingly higher positioning precision in one, two, or three dimensions, the at least one sensor on the tool, the actuator or the terminal link of the kinematic chain for detecting the relative movement to the object to be machined, and a control unit, which calculates a deviation of the detected movement path of the terminal link of the kinematic chain or the tool from a target movement path from the data of the sensor and activates the actuator to compensate for this deviation as completely as possible.

BRIEF DESCRIPTION OF THE DRAWINGS

The present method and the associated device are explained in greater detail once again hereafter on the basis of exemplary embodiments in connection with the drawings. In the figures.

DETAILED DESCRIPTION OF THE EMBODIMENTS

The following exemplary embodiments show the use of the present method when guiding a tool using a robot for machining a workpiece. The movement of the robot hand in relation to the workpiece or to an immobile reference in relation to the workpiece, also referred to as relative movement or relative displacement hereafter, is measured directly by a suitable sensor system and the deviation from the target movement path, also referred to as the target contour, is compensated at the robot hand via a precise positioning kinematic—the additional actuator. With sufficiently rapid sensors and actuators, a system of this type is independent of the precision of the robot used.

Figure 1:
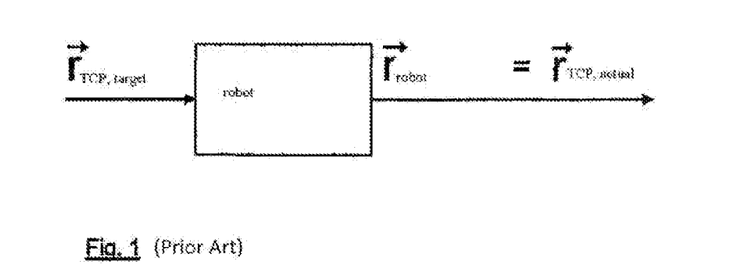
FIG. 1 shows a block diagram for a conventional robot controller when guiding a tool.

In typical robot systems, in which a tool is guided using the robot on a target movement path, the guiding is typically performed by a preprogrammed activation of the robot. The block diagram of a robot controller of this type is shown in FIG. 1. The vector $\vec{r}$ is fixed in place to the workpiece in this and also in the following examples. The location vector $\vec{r}_{TCP,\,target}$ is predetermined by the target movement path. For this purpose, TCP (tool center point) refers to a central reference point of the tool, which is typically identical to the machining point on the workpiece. It is obvious from the block diagram of FIG. 1 that a low path precision of the robot or the robot hand has a direct effect on the position of the TCP $\vec{r}_{TCP,\,actual}$, which then deviates from the target position or target movement path.

Figure 2:
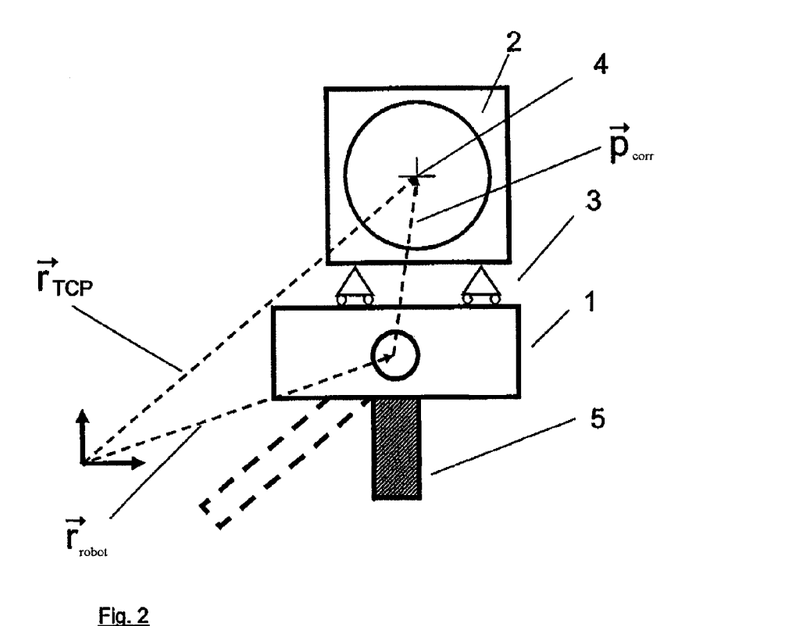
FIG. 2 shows a schematic sketch of a first exemplary embodiment of the present method.

In the present method, an additional actuator 3 is inserted between the robot hand 1 and the tool 2, as may be inferred from the schematic sketch of FIG. 2. This additional actuator 3 represents a fine positioning apparatus, which has a higher positioning precision than the preceding axes of the robot in the kinematic chain. In the present and the following examples, only a one-dimensional fine positioning movement is viewed for this purpose. Of course, by suitable selection of the additional actuator, however, fine positioning may also be implemented in two or three dimensions.

The irregularities of the movement axes of the robot may be compensated for by the additional actuator 3, so that the TCP 4 is always at the correct position with high precision, i.e. $\vec{r}_{TCP,\,target} = \vec{r}_{TCP,\,actual}$. The sensor 5 is fastened rigidly on the robot hand 1 in this example.

Figure 3:
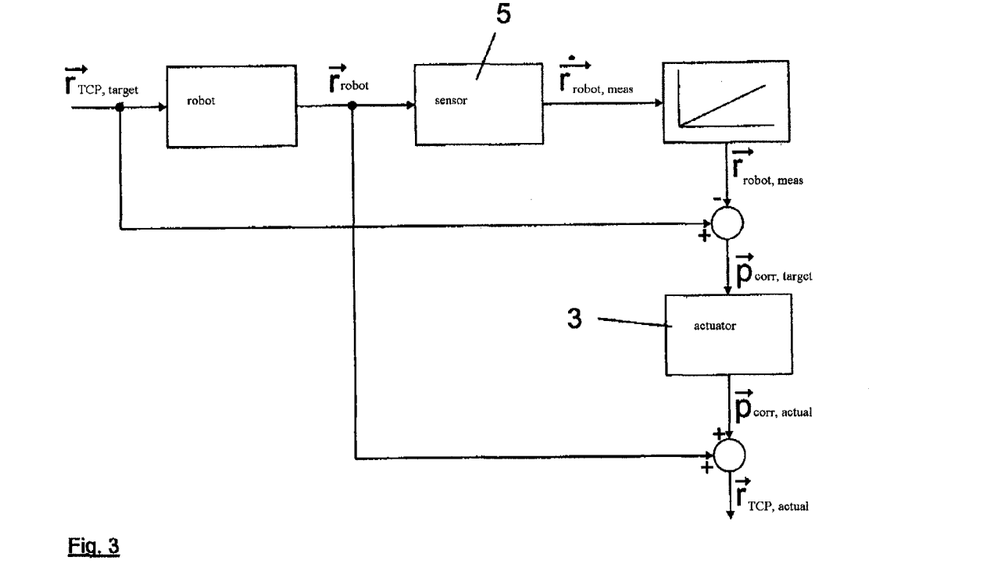
FIG. 3 shows a block diagram for the exemplary embodiment of FIG. 2.

FIG. 3 shows the block diagram for a robot controller having this principle. The vector $\vec{p}$ is fixed in place to the robot head or the robot hand 1 and represents the variable influenced by the actuator 3. The sensor 5 detects the movement velocity and direction of the robot hand 1 in relation to the workpiece, i.e., the velocity vector $\dot{\vec{r}}_{robot,\,meas}$. A deviation from the target movement path may be ascertained from this information and corrected by changing the vector $\vec{p}$.

Figure 4:
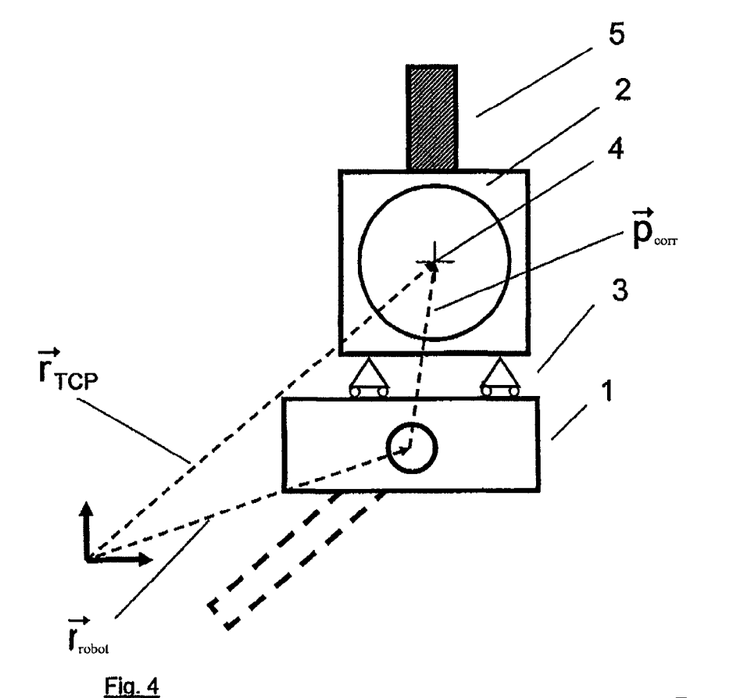
FIG. 4 shows a schematic sketch of a second exemplary embodiment of the present method.
Figure 5:
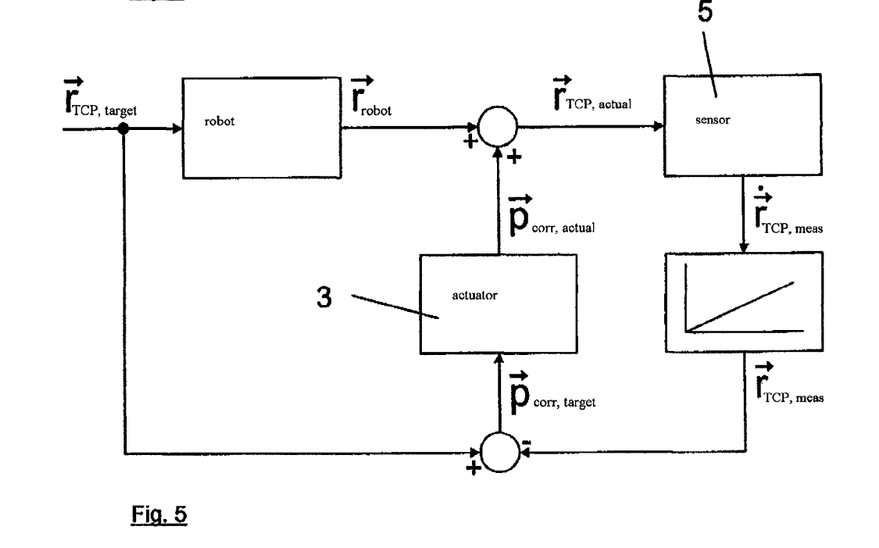
FIG. 5 shows a block diagram for the exemplary embodiment of FIG. 4.

FIG. 4 shows a schematic sketch of a further exemplary embodiment of the present method. This design differs from the design of FIG. 2 solely in that the sensor 5 is not attached to the robot hand 1, but rather is rigidly connected to the tool 2. The associated block diagram is shown in FIG. 5. In this case, the sensor 5 detects the actual movement of the TCP 4, in order to ascertain a deviation from the target movement path or current target position $\vec{r}_{TCP,\,target}$ from the movement vector. The actuator 3 is in turn activated for compensation on the basis of this deviation.

Figure 6:
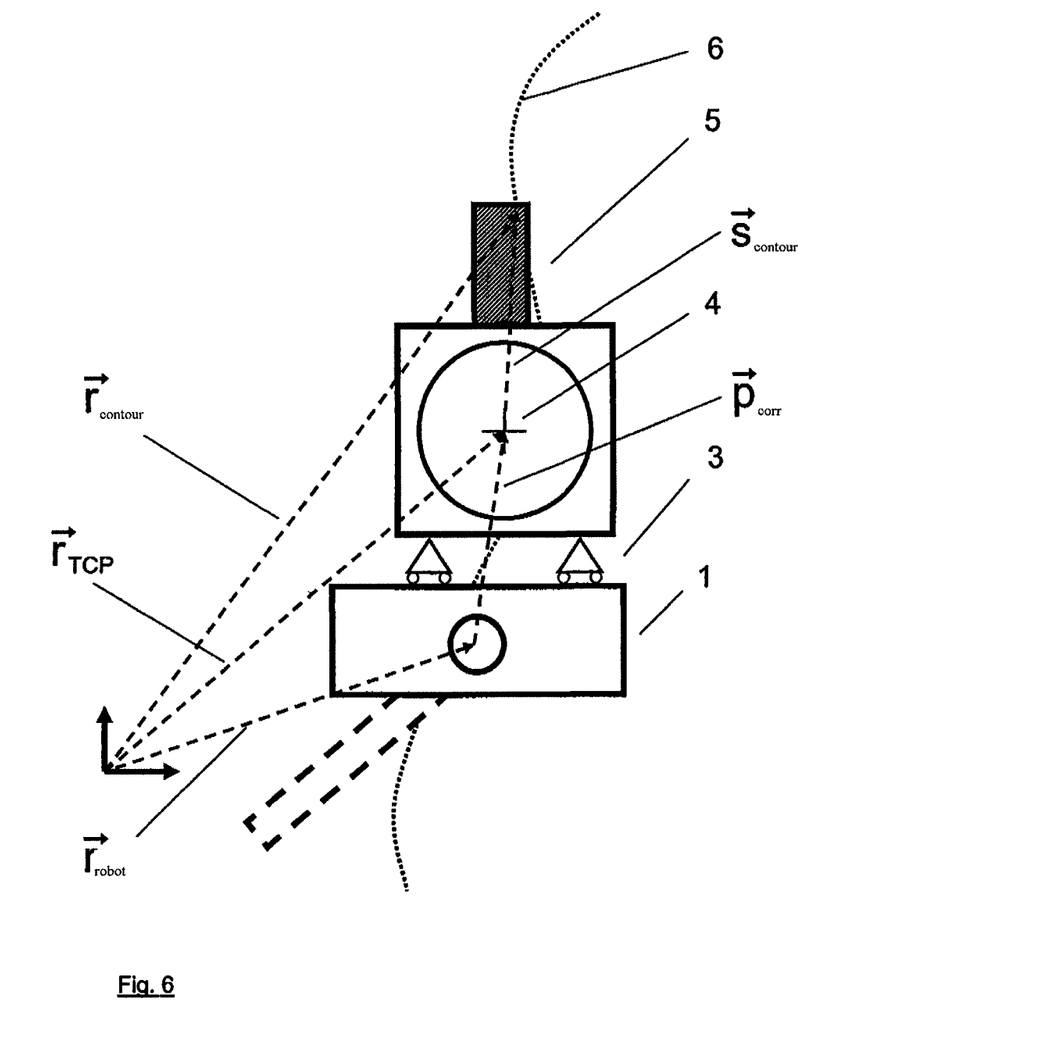
FIG. 6 shows a schematic sketch of a third exemplary embodiment of the present method.

FIG. 6 shows a schematic sketch of a further embodiment of the present method. In this embodiment, the target contour or target movement path is not predetermined by the controller of the robot, but rather measured online at the machining head via a contour to be followed. This contour may be a workpiece contour such as the workpiece edge or a gap in butt welding, for example. Furthermore, the possibility exists of detecting a contour applied by color or structural change as the target contour. In this design, the handling apparatus must only travel along the contour to be followed inside the measuring area of a contour measuring sensor (in the event of a sensor fixed in place to the robot hand) or within the positioning area of the actuator (in the event of a sensor fixed in place to the TCP). The measurement of the target position and the fine positioning are performed by the additional sensor (contour measuring sensor) and the actuator 3. A corresponding schematic sketch is shown in FIG. 6. This figure additionally shows the contour 6, which is applied to the workpiece or already predetermined by the workpiece, and which is detected using the additional sensor or also using the sensor 5 for detecting the relative movement. The additional location vector $\vec{s}_{contour}$ corresponds to the vector from the TCP 4 to the currently measured point of the target contour.

Figure 7:
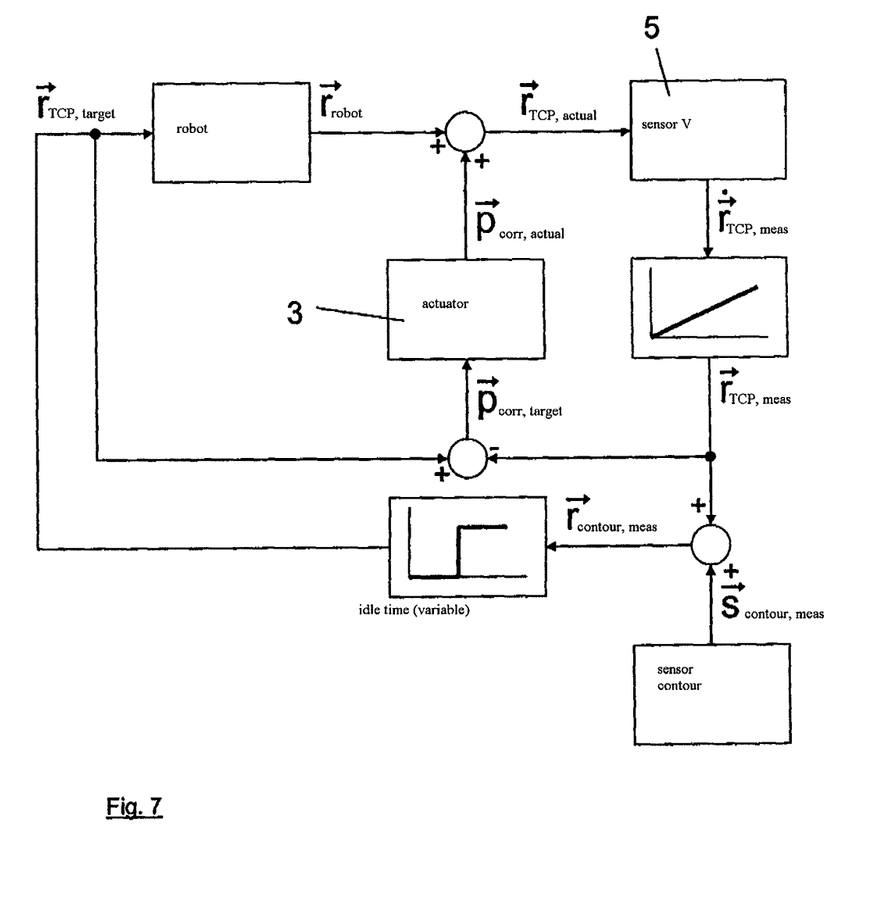
FIG. 7 shows a block diagram for the exemplary embodiment of FIG. 6.

FIG. 7 shows the block diagram of the robot controller in a design of the method of this type. The vector $\vec{s}$ is fixed in place in relation to the sensor 5 or TCP 4. The target contour or target movement path is detected by the measurement of the marking or contour, which lies in front of the machining head in the movement direction, and may be used as the manipulated variable for the robot itself. The fine positioning is still performed by the actuator 3. Autonomous tracking of contours on the workpiece is thus possible. Programming of the target contour is dispensed with.

The variable idle time indicated in FIG. 7 results from the fact that the trajectory of the robot hand $\vec{r}_{robot}(t)$ does not necessarily have the same length as the measured trajectory of the contour $\vec{r}_{contour,\,meas}(t)$. The difference of the trajectory lengths would result in a variation of the resulting feed velocity $\dot{r}_{TCP}$ in the event of constant idle time. A constant feed velocity is achieved by calculating equidistant points on the contour trajectory $\vec{r}_{contour,\,meas}(t)$ these not necessarily being coincident with the measured points of the trajectory, i.e., having to be interpolated. A constant feed velocity $\dot{r}_{TCP}$ if the trajectory lengths of the contour $\vec{r}_{contour,\,meas}(t)$ and the robot hand $\vec{r}_{robot}(t)$ are not equal results in a deviation between positions of the robot hand $\vec{r}_{robot}$ and the TCP $\vec{r}_{TCP}$, which may be greater than the positioning travel of the actuator. In this case, a correction of the feed of the robot hand $\dot{r}_{robot}$ or an adaptation of the feed velocity of the TCP $\dot{r}_{TCP}$ must be performed.

Figure 8:
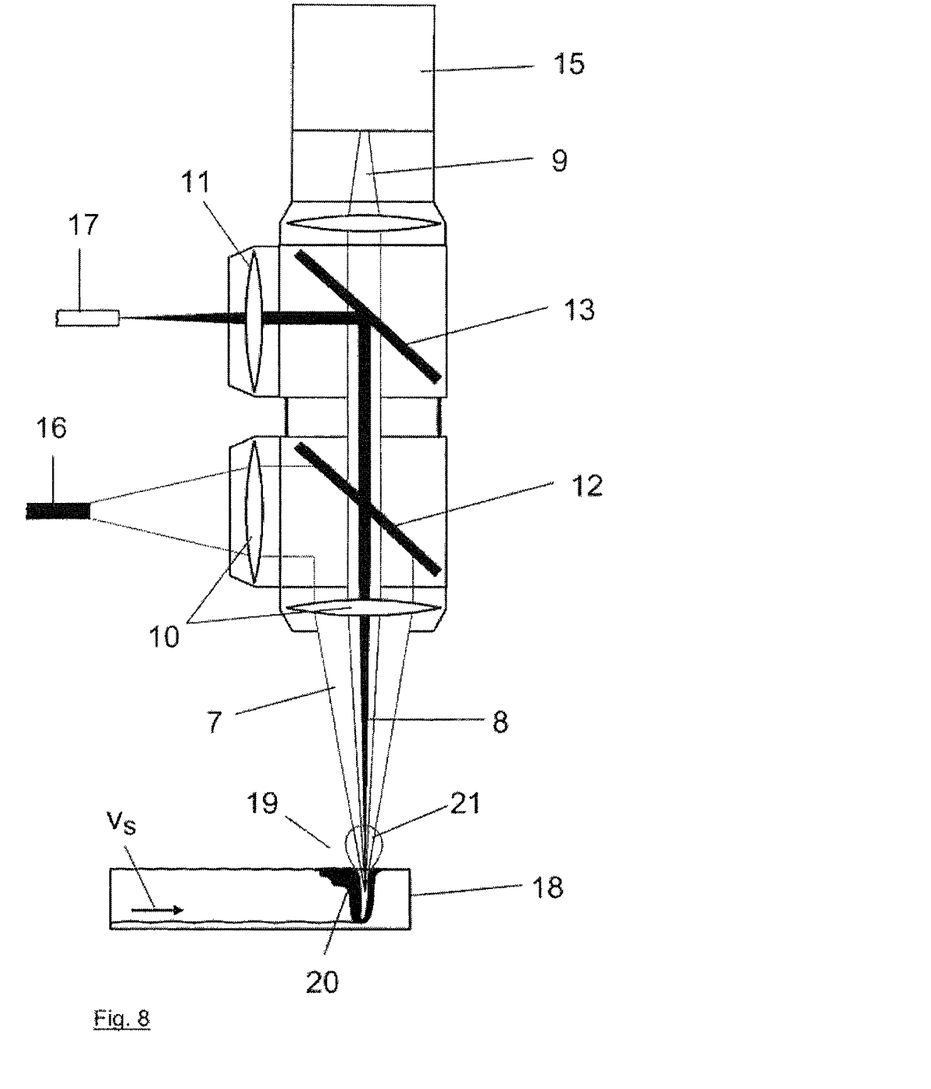
FIG. 8 shows an example of the optical construction for measuring the relative movement in the present method.

In an exemplary design, an optical beam, in particular a laser beam 7, is used to machine the workpiece 18. FIG. 8 shows an optical construction having a tool of this type for this purpose, in which the sensor for measuring the relative movement is integrated. The relative movement is detected for this purpose by correlation of sequential surface images of the workpiece 18, which are recorded using a camera 15 attached on the machining head. In this case, as also in machining methods having different energy radiation, the observation and illumination may be performed coaxially to the machining beam, so that a very compact construction and a measurement in direct proximity to the TCP are made possible.

For this purpose, FIG. 8 shows the machining head having a beam shaping or focusing optic 10 and a dichroic deflection mirror 12, using which the laser beam 7 coupled in via a fiber 16 is directed onto the surface of the workpiece 18. During the machining, the workpiece 18 is moved at the velocity $v_S$ under the laser beam 7 in order to achieve the desired machining result. The machining head also has a coupling opening for the illumination beam 8, in the present case a laser beam of a laser diode. The illumination beam 8 is introduced via a beam splitter plate 13 through the dichroic deflection mirror 12 to illuminate the machining zone 19 of the workpiece. It is obvious that the wavelength of the illumination beam 8 must be selected suitably so that the illumination may occur through the dichroic mirror 12. The beam shaping is performed via an illumination optic 11 in connection with the part of the focusing optic 10 on the workpiece side, which is used for the laser beam shaping.

The optical beam components 9 reflected back from the workpiece surface take the same route back through the beam splitter plate 13 to a CMOS camera 15, which records a locally-resolved image of the radiation reflected back from the machining zone 19. The CMOS camera 15 is connected in this example, and also in the example of FIG. 10, to an analysis unit (not shown), which ascertains the relative movement from the recorded reflection patterns by comparison.

During the machining of the workpiece 18 using the laser beam 7, the material is locally converted into the gaseous phase 21 and partially locally melted by the high intensity of the laser beam 7 at the location of incidence, as illustrated by the molten area 20 in FIG. 8. During this machining, a reflection pattern of the workpiece surface around the currently machined area is obtained by the coaxial illumination and recording of the beam components 9 of this illumination reflected back from the machining zone. The relative velocity may be ascertained during the relative movement between workpiece 18 and machining head by repeated recording of a reflection pattern of this type.

In this design, the measurement of the target contour may be performed using the same sensor, i.e., a CMOS or high-speed camera. Detecting the contour position by grayscale analysis of images recorded in the incident light suggests itself as the analysis method. A method for analyzing images of this type is known.

Figure 9:
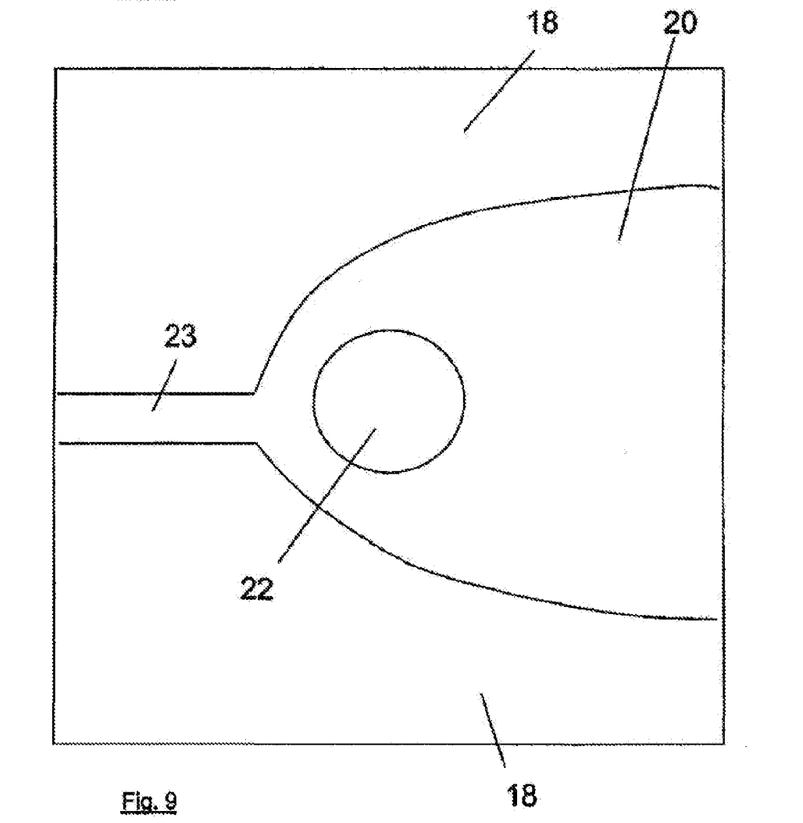
FIG. 9 shows an example of a schematic image detected using the sensor, from which a target movement path may also be ascertained.

For this purpose, FIG. 9 shows an example of an image recorded using the camera during a laser welding process in schematic form. The gap 23 at the butt joint, which is recognizable in the movement direction in front of the machining point 22, may be analyzed to detect the target movement path.

The same recording or a chronological sequence of recordings of this type is used to detect the relative movement between machining head and workpiece 18.

Figure 10:
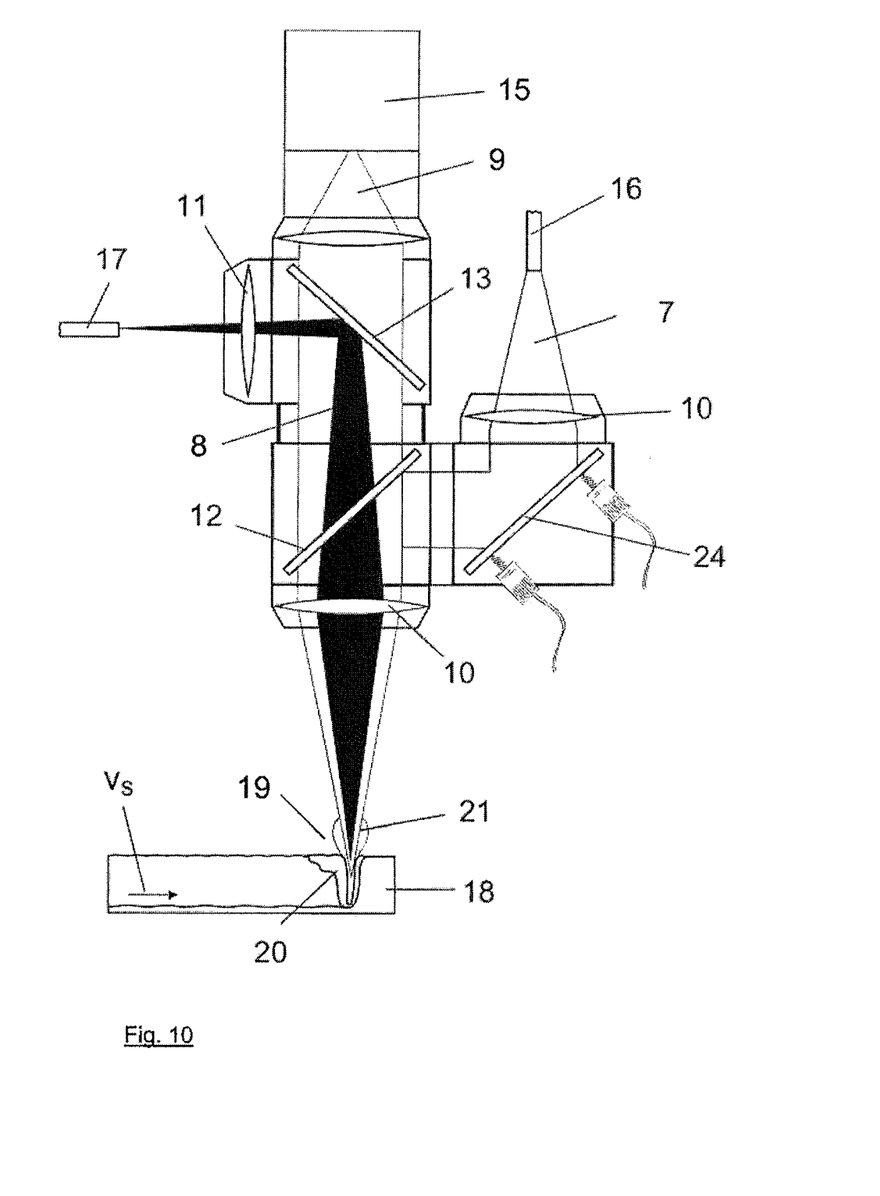
FIG. 10 shows an example of the optical construction for measuring the relative movement and simultaneously detecting the target contour in the present method.

Finally, FIG. 10 shows an example of a machining head having an adjustment mirror 24, integrated in the machining head, as an additional actuator, via which the laser beam 7 may be tracked for fine positioning in two dimensions. The further components correspond to the design of FIG. 8, as already explained. This design also allows coaxial observation and illumination for simultaneous contour and displacement measurement. By fastening the machining head on the robot hand of a robot (not shown), the sensor is fixed in place to the robot hand in this case.

A further design of the present method comprises attaching punctual or linear markings as an absolute reference on the workpiece, which are approached by the handling apparatus before the machining. A sensor on the machining head detects the position of these markings in relation to the TCP. The handling apparatus then moves the machining head to the starting position of the machining, the movement of the machining head being measured in relation to the workpiece. A deviation of the target position from the position approached by the handling apparatus is compensated for by the actuator of the machining head.

LIST OF REFERENCE NUMERALS 1 robot hand
2 tool
3 actuator
4 TCP
5 sensor
6 contour
7 machining laser beam
8 illumination beam
9 back-reflected beam components
10 focusing optic
11 illumination optic
12 dichroic mirror
13 beam splitter plate
14 scraper mirror
15 CMOS camera
16 fiber for machining beam
17 fiber for illumination beam
18 workpiece
19 machining zone
20 molten area
21 gaseous phase
22 machining point
23 gap
24 adjustment mirror

The invention claimed is:

1. A method for fine positioning of a tool during machining of an object, in which the tool or the object is guided by a handling apparatus having multiple movement axes for a coarse positioning of the tool or the object, wherein the multiple movement axes form a kinematic chain, the handling apparatus further having an actuator situated between a terminal link of the kinematic chain and the tool or the object, wherein the actuator has a higher positioning precision than the other movement axes in at least one dimension or axis, the method comprising:

detecting a relative velocity and a relative direction of movement between the object and the tool or terminal link of the kinematic chain by using at least one sensor, wherein the at least one sensor comprises a camera;

illuminating a surface of the object in the area of a machining point using optical radiation;

repeatedly detecting optical radiation reflected from the surface of the object in an area of the machining point using the camera, in order to obtain optical reflection patterns of the surface of the object at different times, wherein the repeated detection occurs at time intervals in which chronologically sequential reflection patterns of overlapping surface areas of the object are obtained;

ascertaining the relative velocity and the relative direction of movement by comparing the chronologically sequential reflection patterns;

calculating an actual movement path of the tool, the object, or the terminal link from the relative velocity and relative direction of movement; and compensating a deviation of the actual movement path from a target movement path, by positioning of the tool or the object using the actuator based on the deviation.

2. The method according to claim 1, including predefining the target movement path by a control unit of the handling apparatus.

3. The method according to claim 1, comprising:

detecting a marking, which is artificially attached or naturally present on the object in front of an actual machining point in a machining direction, by using the sensor or a further sensor in order to ascertain a target movement, and ascertaining one point of the target movement path at a time from a relative position of the marking to the sensor or the further sensor.

4. The method according to claim 3, comprising:

detecting the target movement path on the basis of the marking which is artificially applied to the object by color or structural change.

5. The method according to claim 3, comprising:

detecting the target movement path on the basis of an object contour.

6. The method according to claim 3, comprising:

using the target movement path as a manipulated variable for the handling apparatus.

7. The method according to claim 1, comprising:

detecting the relative velocity and the relative direction of movement using a sensor fastened rigidly on the terminal link of the kinematic chain.

8. The method according to claim 1, comprising:

detecting the relative velocity and the relative direction of movement using a sensor fastened rigidly on the tool or actuator.

9. The method according to claim 1, comprising:

during the machining of the object using a machining beam, performing the detection of the optical radiation reflected from the surface of the object at least approximately coaxially to the machining beam.

10. The method according to claim 1, comprising:

during the machining of the object using a machining beam, performing the illumination of the surface of the object at least approximately coaxially to the machining beam.

11. The method according to claim 1, comprising:

before the machining, applying reference markings to the object, approaching the reference markings by the handling apparatus, in order to detect the position of the reference markings in relation to the tool using the sensor, and subsequently moving the tool by the handling apparatus to a starting position of the machining, detecting the relative velocity and the relative direction of movement between the object and the tool or terminal link of the kinematic chain using the sensor and compensating a deviation from the starting position by tracking the tool using the actuator.

12. A device for the fine positioning of a tool during the machining of an object, comprising:
- a handling apparatus having multiple movement axes for a coarse positioning of a tool or object, which multiple movement axes form a kinematic chain;
- an actuator fastened on a terminal link of the kinematic chain to allow a fine positioning of the tool or object in at least one dimension or axis at a higher precision than the other movement axes;
- at least one sensor to detect a relative velocity and a relative direction of movement between the object and the tool or terminal link of the kinematic chain, wherein the sensor is a camera;
- a machining head, which includes a coupling opening for a machining beam and a beam shaping optic to direct the machining beam along a beam axis through an outlet opening on a machining plane lying in front of the machining head, wherein the sensor is connected mechanically fixed to the machining head and is situated to detect the optical radiation reflected from the machining plane parallel or at a small angle to the beam axis in a locally-resolved way; and
- a control unit having an image processing algorithm for analyzing chronologically sequential reflection patterns for the automated determination of the relative velocity and the relative direction of movement between the machining head and the object, wherein the control unit activates the actuator to compensate a deviation of an actual movement path of the tool, the object, or the terminal link from a target movement path, which deviation is calculated from measured data of the sensor.

13. The device according to claim 12,
wherein the control unit is adapted to calculate the target movement path from measured data of the sensor or a further sensor of the device on the basis of a marking artificially attached or naturally existing on the object, which is detected using the sensor or a further sensor.

14. The device according to claim 12,
wherein the sensor is rigidly fastened on the terminal link of the kinematic chain.

15. The device according to claim 12,
wherein the sensor is rigidly fastened on the tool or actuator.

16. The device according to claim 12,
wherein the machining head has a further coupling opening for an illumination beam and an illumination optic, which directs the illumination beam onto the machining plane at least approximately coaxially to the beam axis of the machining beam.

* * * * *